(12) United States Patent
Shakespeare et al.

(10) Patent No.: US 10,127,023 B2
(45) Date of Patent: Nov. 13, 2018

(54) COMPUTER-AIDED DEVELOPMENT OF NATIVE MOBILE APPLICATION CODE

(71) Applicant: Oracle International Corporation, Redwood Shores, CA (US)

(72) Inventors: Darryl Martin Shakespeare, Denver, CO (US); David Wayne Nowakowski, Thornton, CO (US); Nicole Jodie Laurent, Lakewood, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/463,179

(22) Filed: Aug. 19, 2014

(65) Prior Publication Data

US 2015/0089469 A1     Mar. 26, 2015

Related U.S. Application Data

(60) Provisional application No. 61/880,830, filed on Sep. 20, 2013, provisional application No. 61/880,828, filed on Sep. 20, 2013.

(51) Int. Cl.
*G06F 8/36* (2018.01)
*G06F 8/61* (2018.01)
(Continued)

(52) U.S. Cl.
CPC ............... *G06F 8/36* (2013.01); *G06F 8/20* (2013.01); *G06F 8/61* (2013.01); *G06F 9/44521* (2013.01)

(58) Field of Classification Search
CPC ............... G06F 8/36; G06F 8/20; G06F 8/30
(Continued)

(56) References Cited

U.S. PATENT DOCUMENTS

| 7,793,255 B1 | 9/2010 | Kawaguchi |
| 7,933,221 B1 | 4/2011 | Pawar et al. |

(Continued)

OTHER PUBLICATIONS

Argo, "Documentation", Sep. 22, 2012, 4 pages, url: http://argo.sourceforge.net/documentation.html.
(Continued)

*Primary Examiner* — Li B Zhen
*Assistant Examiner* — Daniel Wei
(74) *Attorney, Agent, or Firm* — Vista IP Law Group, LLP

(57) ABSTRACT

A method, system, and computer program product for computer-aided software application development. A synthesizer commences upon receiving a mobile device identifier and additional information such as an application identifier, an object model, and/or a form identifier, then analyzing the additional information to determine what form(s) to implement on the mobile device. Further synthesis processing includes analyzing the forms to determine a set of functions to implement on the identified mobile device. Using the determined set of functions, native application code modules are retrieved from a repository. The retrieved native application code modules correspond to the set of functions. The code modules are integrated together to generate a native mobile application, which can be deployed to a mobile device. Messages from the mobile device are intercepted so as to emulate form processing of a back-end application. Any back-end applications that use the form can be accessed by the native mobile application.

23 Claims, 12 Drawing Sheets

(51) Int. Cl.
*G06F 8/20* (2018.01)
*G06F 9/445* (2018.01)

(58) Field of Classification Search
USPC .......................................................... 717/106
See application file for complete search history.

(56) References Cited

U.S. PATENT DOCUMENTS

| | | | |
|---|---|---|---|
| 8,261,231 | B1 | 9/2012 | Hirsch et al. |
| 8,352,903 | B1* | 1/2013 | Friedman ...................... 717/100 |
| 2002/0069157 | A1 | 6/2002 | Jordan |
| 2003/0115548 | A1 | 6/2003 | Melgar |
| 2005/0028157 | A1 | 2/2005 | Betancourt et al. |
| 2006/0075070 | A1* | 4/2006 | Merissert-Coffinieres ................. G06F 8/00 709/218 |
| 2006/0085824 | A1 | 4/2006 | Bruck et al. |
| 2006/0212537 | A1 | 9/2006 | Hans et al. |
| 2006/0277231 | A1* | 12/2006 | Kral .......................... G06F 8/70 708/102 |
| 2007/0168489 | A1 | 7/2007 | Kwon |
| 2009/0193393 | A1 | 7/2009 | Baldwin et al. |
| 2009/0259990 | A1 | 10/2009 | Olsson et al. |
| 2010/0083281 | A1 | 4/2010 | Malladi et al. |
| 2010/0180328 | A1 | 7/2010 | Moas et al. |
| 2010/0216434 | A1 | 8/2010 | Marcellino et al. |
| 2011/0131567 | A1 | 6/2011 | Tirk et al. |
| 2011/0177803 | A1* | 7/2011 | Hans et al. ................... 455/418 |
| 2012/0036494 | A1* | 2/2012 | Gurumohan ......... G06Q 10/103 717/106 |
| 2012/0173615 | A1 | 7/2012 | Greer |
| 2012/0245918 | A1 | 9/2012 | Overton et al. |
| 2013/0019314 | A1 | 1/2013 | Ji |
| 2013/0110547 | A1 | 5/2013 | Englund |
| 2013/0205305 | A1* | 8/2013 | Lv ................................ 719/313 |
| 2013/0238456 | A1 | 9/2013 | Soysa et al. |
| 2013/0239086 | A1 | 9/2013 | Brendza et al. |
| 2014/0075347 | A1* | 3/2014 | Banerjee ................... G06F 8/38 715/763 |
| 2014/0281886 | A1* | 9/2014 | Hirsch ................ G06F 17/2247 715/234 |
| 2014/0282371 | A1* | 9/2014 | Hirsch ...................... G06F 8/36 717/106 |
| 2014/0351684 | A1* | 11/2014 | Smit ...................... G06Q 10/06 715/222 |
| 2015/0050922 | A1* | 2/2015 | Ramalingam ......... H04W 12/08 455/418 |
| 2016/0085520 | A1* | 3/2016 | Zhao ......................... G06F 8/35 717/105 |

OTHER PUBLICATIONS

International Search Report and Written Opinion dated Dec. 30, 2014, for related PCT Application No. PCT/US2014/056677, 9 pages.
Non-final Office Action dated Jan. 13, 2015 for U.S. Appl. No. 14/179,548.
Final Office Action dated Jul. 2, 2015 for U.S. Appl. No. 14/179,548.
Non-final Office Action dated Nov. 6, 2015, for related U.S. Appl. No. 14/179,548.
Final Office Action dated Jun. 9, 2016 for related U.S. Appl. No. 14/179,548.
Aziz, et al., "An Introduction to JavaScript Object Notation (JSON) in JavaScript and .NET" Feb. 2007, <msdn.microsoft.com/en-us/library/bb299886.aspx#intro_to_json_topic3>.
Non-final Office Action dated Mar. 2, 2017 for related U.S. Appl. No. 14/463,532.
Notice of Allowance and Fee(s) due dated Oct. 25, 2016 for related U.S. Appl. No. 14/179,548.
Extended European Search Report dated Aug. 9, 2016 for the corresponding/related EP Patent Application No. 14845448.1, 8 pages.
Notice of Allowance and Fee(s) due dated Jul. 24, 2017 for related U.S. Appl. No. 14/463,532.

* cited by examiner

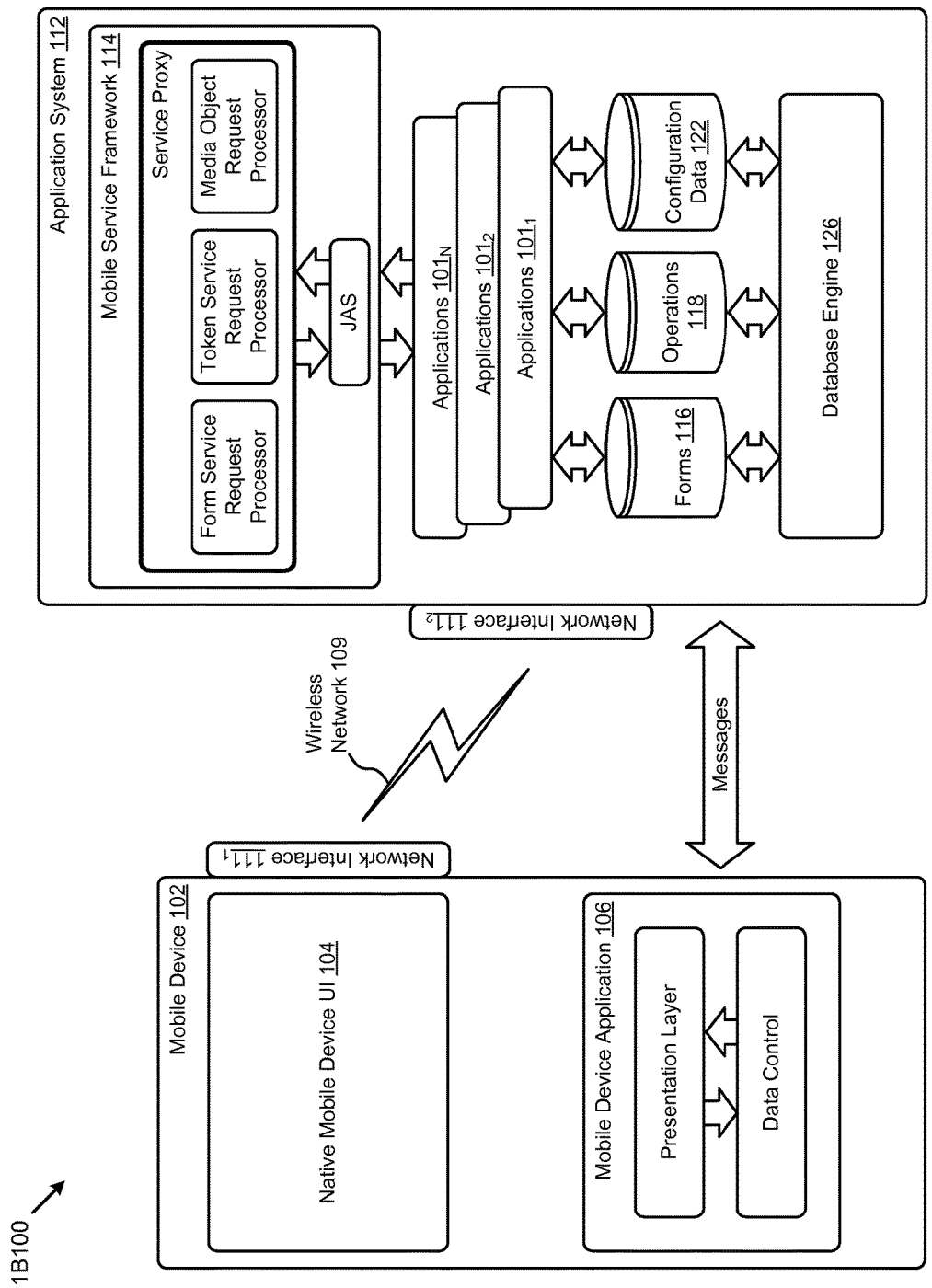
FIG. 1B1

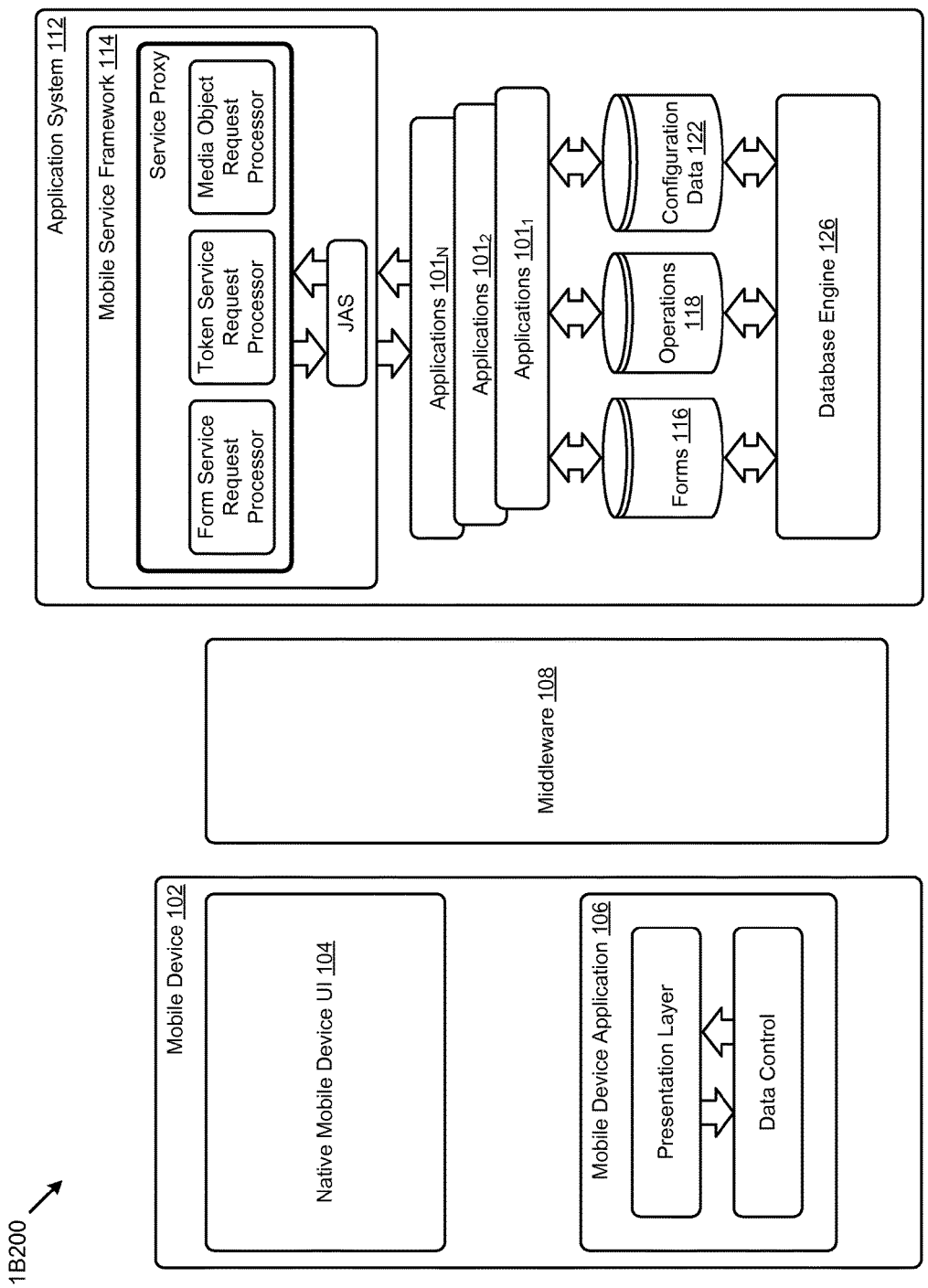
FIG. 1B2

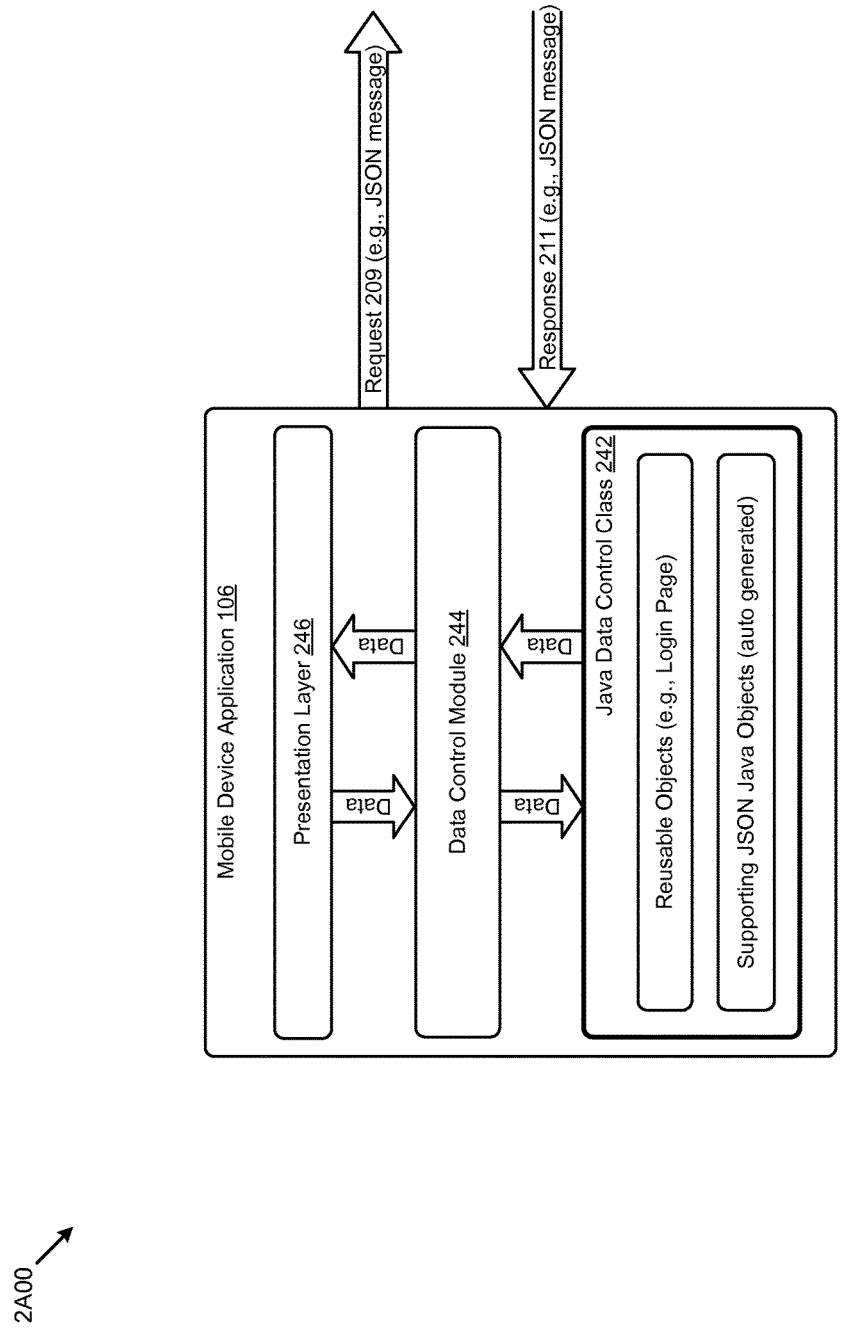

COMPUTER-AIDED DEVELOPMENT OF NATIVE MOBILE APPLICATION CODE

RELATED APPLICATIONS

The present application claims the benefit of priority to U.S. Patent Application Ser. No. 61/880,830, entitled "DEVELOPMENT OF NATIVE MOBILE APPLICATION CODE", filed Sep. 20, 2013; and the present application claims the benefit of priority to U.S. Patent Application Ser. No. 61/880,828, entitled "PERFORMING FORM-ORIENTED OPERATIONS FROM AN EXTERNAL SYSTEM", filed Sep. 20, 2013, both of which are hereby incorporated by reference in their entirety.

The present application is related to U.S. patent application Ser. No. 14/463,532, entitled "ACCESSING APPLICATION SERVICES FROM FORMS", filed on even date herewith, which is hereby incorporated by reference in its entirety.

FIELD

The disclosure relates to the field of computer-aided software application development and more particularly to techniques for automatic synthesis of native mobile applications based on an application object model.

BACKGROUND

Mobile devices are everywhere, and users are demanding to use their mobile devices in the same or similar ways to the ways they use desktop applications. The demand for more-and-more and faster-and-faster deployments of mobile applications is acute, yet no easy or standard ways of synthesizing a native application to run on a mobile device have emerged. Legacy techniques include creating application plug-ins that run in a mobile device's browser, however such legacy approaches fail to produce mobile applications that run native to the device (e.g., without reliance on a browser). In other legacy cases, even where a mobile device supports downloadable apps or applets, and even where such mobile applications include use of mobile device system resources beyond resources available to a browser, hand-coding of native applications or development of apps or plug-ins specific to each mobile device and/or each operating system is far too cumbersome. Techniques are needed address the problem of rapid development and deployment of applications targeted to run on heterogeneous mobile platforms and yet interface with back-end (e.g., server-based) applications in ways that are similar or identical to the way a desktop application operates.

None of the aforementioned legacy approaches achieve the capabilities of the herein-disclosed techniques for automatic synthesis of native mobile applications based on an application object model. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for automatic synthesis of native mobile applications based on an application object model. The claimed embodiments address the problem of rapid development and deployment of applications targeted to run on heterogeneous mobile platforms. More specifically, some claims are directed to approaches for synthesizing a collection of native code to conform to a given object model, which claims advance the technical fields for addressing the problem of rapid development and deployment of applications targeted to run on heterogeneous mobile platforms, as well as advancing peripheral technical fields. Some claims improve the functioning of multiple systems within the disclosed environments.

A synthesizer commences upon receiving a mobile device identifier and additional information such as an application identifier, an object model, and a form identifier, then analyzing the additional information to determine what form or forms to implement on a mobile device of the type identified. Further synthesis processing includes analyzing the form(s) to determine a set of functions to implement on the mobile device. Using the determined set of functions, native application code modules are retrieved from a repository. The retrieved native application code modules correspond to the set of functions (e.g., CREATE, READ, UPDATE, DELETE). The code modules are then assembled to generate a native mobile application, which can be deployed to a mobile device. A server function (e.g., middleware) intercepts messages from the mobile device so as to emulate form processing of a back-end application. Any back-end applications that use the form can be accessed by the native mobile application.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings, described below, are for illustration purposes only. The drawings are not intended to limit the scope of the present disclosure.

FIG. 1B1 depicts an example of a mobile application interaction with a back-end application system, according to some embodiments.

FIG. 1B2 depicts an example of a mobile application interaction with middleware and a back-end application system, according to some embodiments.

FIG. 2A depicts an example of a mobile device application message exchange mechanism, according to some embodiments.

DETAILED DESCRIPTION

Figure 1A:
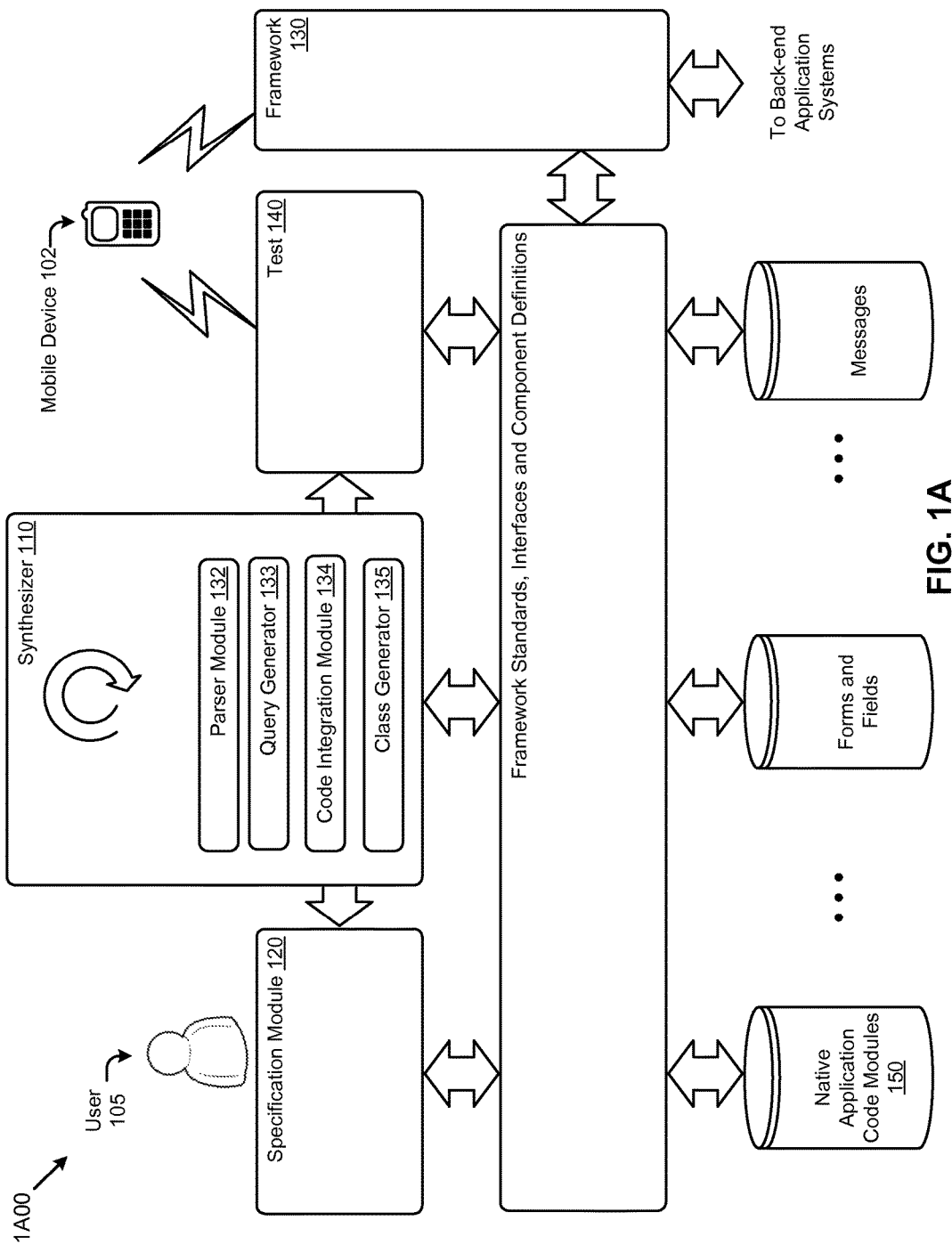
FIG. 1A exemplifies an environment for automatic synthesis of native mobile applications based on an application object model, according to some embodiments.

Some embodiments of the present disclosure address the problem of rapid development and deployment of applications targeted to run on heterogeneous mobile platforms and some embodiments are directed to approaches for synthesizing a collection of native code to conform to a given object model. More particularly, disclosed herein and in the accompanying figures are exemplary environments, methods, and systems for automatic synthesis of native mobile applications based on an application object model.

Overview

The herein-disclosed synthesis system performs specification-based synthesis using only a selected set of pre-packaged code modules (e.g., form- and function-oriented code modules). The resulting mobile device application relies in part on services that facilitate use of a certain a priori-known set of application functions or operations (e.g., sending and receiving form data). In some situations, the herein-disclosed synthesis system performs specification-based synthesis using a form to determine a selected set of pre-packaged functions (e.g., form-oriented functions). The aforementioned services implement a certain known set of operations such as sending and/or receiving form data, and/or creating, reading, updating, or deleting form fields and/or database fields.

When developing software, providing modules or libraries to designers raises the level of abstraction. Indeed it is often much faster to develop a working piece of software when designers adhere to restrictions such as to use only pre-packaged modules or libraries. In considering additional aspects of abstraction, if the designer self-disciplines to use only certain functions, operations or modules (e.g., pre-built functions and/or pre-tested operations), then the possibilities for errors or misfits are greatly reduced. Not only a human designer, but also a computer-aided program (e.g., a synthesis tool) can avail itself of the benefits of a smaller number of possibilities when synthesizing and/or assembling code based on a specification and/or in accordance with a set of rules or restrictions.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A exemplifies an environment 1A00 for automatic synthesis of native mobile applications based on an application object model. As an option, one or more instances of environment 1A00 or any aspect thereof may be implemented in the context of the architecture and functionality of the embodiments described herein. Also, the environment 1A00 or any aspect thereof may be implemented in any desired environment.

As shown, user 105 interacts in this environment to specify an existing "back-end" application (e.g., see the specification module 120). From the specification of an existing back-end application, the data model of the specified application can be known, and also the fields used in forms can be known. A synthesizer module 110 receives a specification from the user and synthesizes a collection of native mobile application code modules. The synthesizer module may comprise a parser module 132 for analyzing a specification, and a query generator 133, which may access framework definitions including framework standards, supported interfaces and component definitions, etc., and/or may access a repository of native application code modules 150 as well as repositories of forms and fields used by back-end applications and/or messages. The synthesizer module may further comprise a code integration module 134 to facilitate assembly of two or more native application code modules.

In some cases, the specification (e.g., from the specification module 120) is sufficient for the synthesizer module to retrieve messages from which to generate Java classes (e.g., using a configurable class generator 135). This technique is further discussed below. The specification module 120 serves to aid the user to specify a back-end application from which a data model can be known. In exemplary cases, a set of forms for the specified application can be known (e.g., based on a convention) or can be specified explicitly. The forms themselves can be coded in a markup language (e.g., HTML). Forms use fields, and any of the fields used in the data model can be extracted, and the extracted fields can be mapped to corresponding operations selected from a library of framework operations (e.g., create, read, update, delete operations). The library of framework operations can contain native code for mobile devices, and may be specific to a particular mobile device or operating system. Such native code for mobile devices can be parameterized and/or can be defined to interact in a priori known ways.

Once the framework operations have been selected and parameterized, code is synthesized to provide relationships (e.g., calls, callbacks, paths) between the selected framework operations. Additional native code can be added to generate a mobile device application such that the code be loaded onto a mobile device and tested. The mobile device application can be tested under various conditions and in various settings, and test results can influence the progression through another iteration to add additional functions to be incorporated into the synthesized application.

Some aspects of the synthesis and some aspects of the resulting native mobile device application relies in part on characteristics of, and interactions with, the framework 130. A set of example characteristics and interactions are discussed as follows.

FIG. 1B1 depicts an example of mobile application interaction 1B100 with a back-end application system configured to interact with synthesized native mobile applications. As an option, one or more instances of mobile application interaction 1B100 or any aspect thereof may be implemented in the context of the architecture and functionality of the embodiments described herein. Also, the mobile application interaction 1B100 or any aspect thereof may be implemented in any desired environment.

The aforementioned framework can take the form of a back-end framework (e.g., mobile service framework 114), which in turn is formed of a service proxy, a Java Application Server (JAS), and any number or grouping of applications (e.g., applications $101_1$, applications $101_2$, etc.). The applications are substantially the same as back-end applications that serve desktop environments. For example, many back-end applications are configurable (e.g., using configuration data 122) and interact with a user via forms (e.g., forms 116), which forms support a set of well-defined form operations (e.g., see operations 118) such as create, read, update, and delete. Any, some or all of the operations 118 serve to access to database engine 126.

The mobile device 102 comprises a native mobile device user interface (UI) 104, configured as a layer, which layer accesses any synthesized instances of a mobile device application 106. The mobile device application 106 in turn is comprised of a presentation layer and a data control layer. Interactions between modules within the presentation layer and the data control layer observe well defined rules such as handshake exchanges to facilitate asynchronous communication and/or such as exchange of data using commonly-accessible data structures that are defined in accordance with native aspects of the mobile device and/or its operating system.

In exemplary cases, the mobile device 102 communicates over a wireless network 109 directly to the network interface of an application system (e.g., using network interface $111_1$ and network interface $111_2$). In other cases, the mobile device 102 communicates over a wireless network 109 directly to middleware. Such a partitioning is shown and described as pertaining to FIG. 1B2.

FIG. 1B2 depicts an example of mobile application interaction 1B200 with a back-end application system configured to interact with synthesized native mobile applications. As an option, one or more instances of mobile application interaction 1B200 or any aspect thereof may be implemented in the context of the architecture and functionality of the embodiments described herein. Also, the mobile application interaction 1B200 or any aspect thereof may be implemented in any desired environment.

The shown mobile application interaction 1B200 includes middleware components (e.g., middleware 108). The middleware in turn may comprise operational units that serve to facilitate communication to and from the mobile device. For example, a middleware component can implement a web server, and such a web server can perform various services to the mobile device that do not require direct interface with the back-end. Strictly as one such example, a middleware component might include a series of service processors (e.g., a form service request processor, a token service request processor, a media object request processor, etc.). The token service request processor can process tokens that in turn refer to passwords or payments or any forms of encrypted or unencrypted data. The media object request processor facilitates transfer and formatting of media objects. For example, a media object processor might perform multiple asynchronous accesses or requests to the mobile device so as to transfer a large media file (e.g., a high resolution image capture) to the back-end applications.

The services provided by a middleware component is not limited to providing services to only mobile devices as heretofore discussed. In some cases, a middleware component can offer services to any external system. Such an example involving an external system is shown and discussed as pertaining to FIG. 2C.

In this environment the middleware components process messages to and from the mobile device and the application system. In exemplary embodiments, the messages follow a predefined protocol. In some cases messages are formatted into messages that comport to a predefined message specification, possibly including predefined objects or portions thereof in the payload of a message, such as in accordance with JavaScript Object Notation (JSON). An exchange mechanism is shown and described in the following FIG. 2A. The specific example of FIG. 2A refers to JSON messaging, however other messaging protocols, formats or notation are possible.

FIG. 2A depicts an example of a mobile device application message exchange mechanism 2A00. As an option, one or more instances of mobile device application message exchange mechanism 2A00 or any aspect thereof may be implemented in the context of the architecture and functionality of the embodiments described herein. Also, the mobile device application message exchange mechanism 2A00 or any aspect thereof may be implemented in any desired environment.

As shown in FIG. 2A, the mobile device application message exchange mechanism comprises a JSON message exchange comprising requests and responses (e.g. a request 209, response 211, etc.). The development effort and synthesis of code can proceed on the basis of the object model of an existing application that follows certain conventions. For example, one convention requires access to a data model representation of the desired mobile application. Given such access, very little or no business model type logic needs to be coded in order to implement the native mobile application. Such a mobile application can be configured with native code to perform create, read, update and delete (CRUD) operations against the given data model. The synthesizer module, possibly with specifications and/or directions provided by a developer can synthesize or create: Java classes (e.g., to deserialize the JSON messages that will be returned by a form request processor to a Java object), a data binding module (e.g., data control module 244) that is configured to bind an object to a particular aspect (e.g., a form field) of the user interface, a Java class (e.g., the shown Java data control class 242) to make requests to a service proxy to execute or initiate the selected application (e.g., in a server environment).

Certain aspects in some embodiments of the present application are related to material disclosed in U.S. patent application Ser. No. 14/179,548, entitled "RULE-BASED AUTOMATIC CLASS GENERATION FROM A JSON MESSAGE" filed on Feb. 12, 2014, the content of which is incorporated by reference in its entirety in this Application.

Java objects are bound to the UI via the data binding module. The synthesizer module generates partitioning so as to assemble additional components, such as user interface components (e.g., as may be implemented in presentation layer 246), and such as a navigation mechanism to navigate between pages implemented by the mobile application.

The synthesis process then consists of iterations by the mobile application developer to use the synthesis capabilities to guide generation of the mobile application code. Using the synthesis capabilities allows the developer to create a platform-independent mobile device applications. Strictly as one example, a mobile device can be identified by a mobile device identifier (e.g., iOS or Android or Windows mobile, etc.), and native mobile device code can be retrieved and/or assembled, and/or generated for the specified device (e.g., based on the mobile device identifier).

Figure 2B:
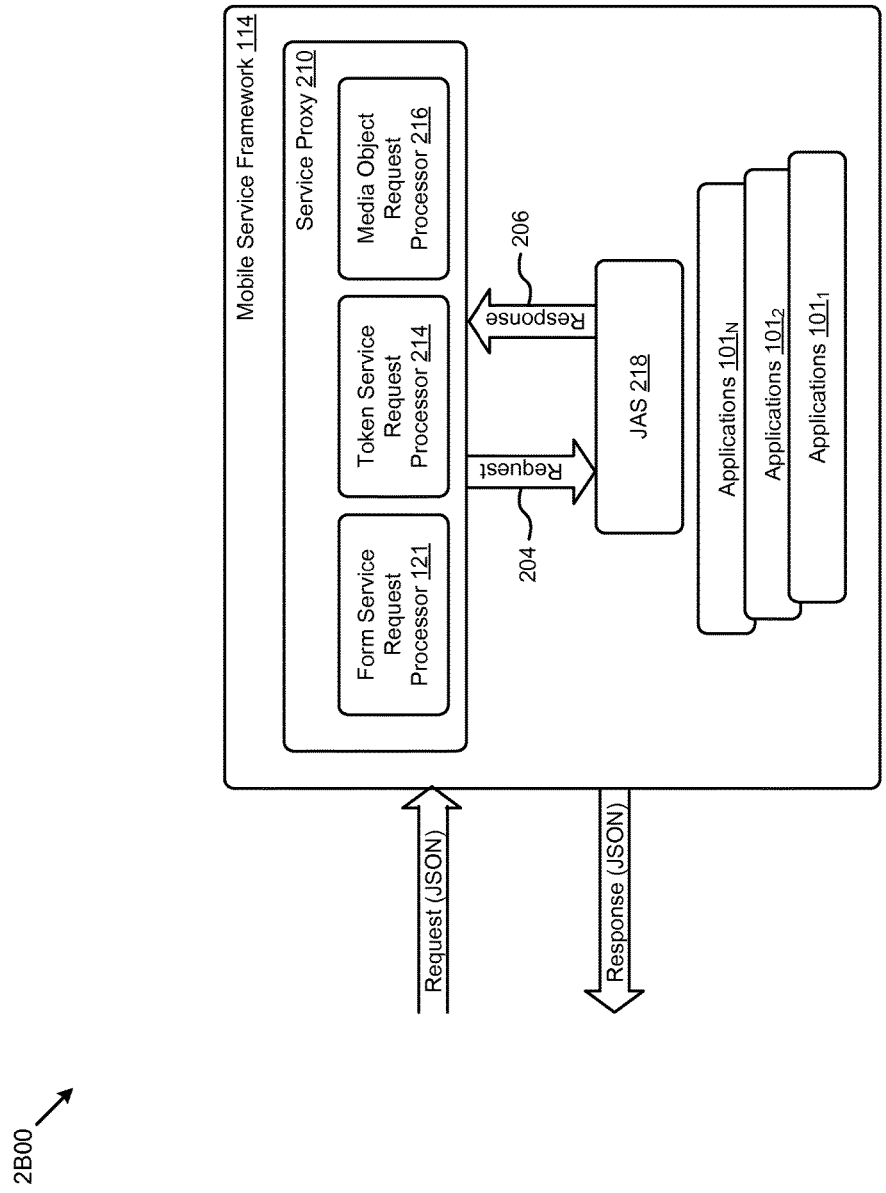
FIG. 2B depicts an example of a mobile service framework message exchange mechanism configured to interact with automatically-synthesized native mobile applications, according to some embodiments.

FIG. 2B depicts an example of a mobile service framework message exchange mechanism 2B00 configured to interact with automatically-synthesized native mobile applications. As an option, one or more instances of mobile service framework message exchange mechanism 2B00 or any aspect thereof may be implemented in the context of the architecture and functionality of the embodiments described herein. Also, the mobile service framework message exchange mechanism 2B00 or any aspect thereof may be implemented in any desired environment.

As shown in FIG. 2B, the mobile service framework message exchange mechanism comprises a JSON exchange in which exchanged messages are generated and/or consumed by a mobile service framework 114. As shown, the mobile service framework 114 comprises a combination of multiple pre-packaged technologies that together form a framework which can be used as building blocks for a developer to rapidly develop a native mobile application. In the example of FIG. 2B, the mobile service framework comprises several components. First, a service proxy 210 serves for message steering and flow control, and serves as an abstraction layer (e.g., exposing only certain sets of functions). The service proxy may be partitioned into several partitions, each partition dedicated to processing certain types of requests. Strictly as an example, the shown service proxy 210 comprises a form service request processor 121, a token service request processor 214, and a media object request processor 216. Such request processors facilitate execution of application layer functions as a service. Second, the example includes a Java Application Server (JAS). As shown, the JAS 218 is modified to handle requests from the service proxy 210 via a request 204 and response 206 protocol. Third, the example includes one or more back-end applications (e.g., applications $101_1$, applications $101_N$).

In exemplary development environments, configuration of a mobile service framework 114 is facilitated by the availability of reusable pre-packaged features in binary code format (e.g., in .jar files), for example, a login form can be provided in a .jar file. Exemplary development environments may also include one or more instances of a configurable class generator 135 that creates Java classes specific to a given JSON messages. These classes are used, for example, to deserialize a JSON message returned by the service proxy based on the mobile application's request to a Java object.

The services provided by the mobile service framework 114 and service proxy 210 are not limited to providing services to only the mobile devices as heretofore discussed. In some cases a mobile service framework and service proxy can offer services to any external system. Such an example involving an external system is shown and discussed as pertaining to FIG. 2C.

Figure 2C:
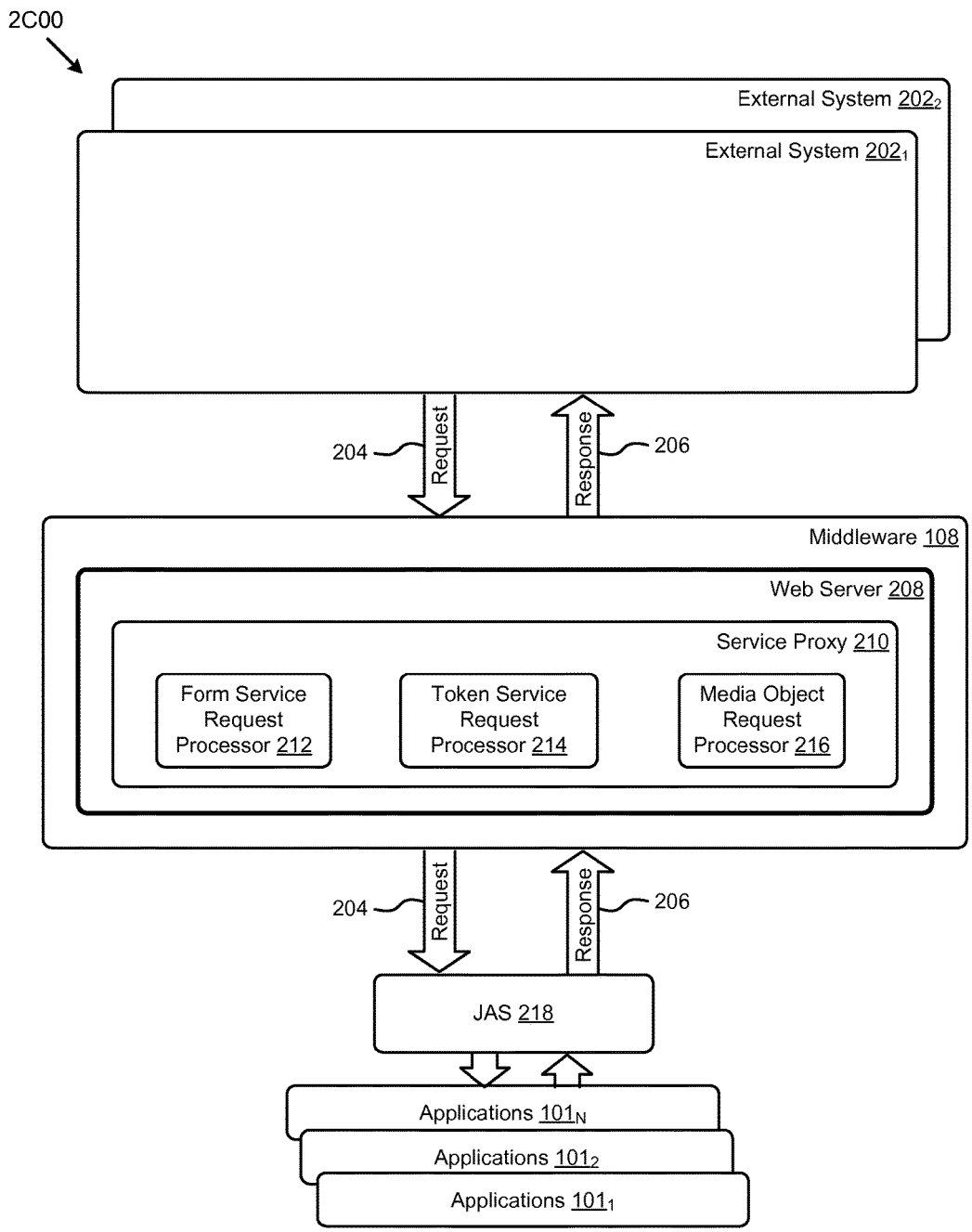
FIG. 2C depicts a multi-tier environment including a service proxy implemented within a middleware component configured to interact with automatically-synthesized native mobile applications, according to some embodiments.

FIG. 2C depicts a multi-tier environment 2C00 including a service proxy implemented within a middleware component configured to interact with automatically-synthesized native mobile applications. As an option, one or more instances of multi-tier environment 2C00 or any aspect thereof may be implemented in the context of the architecture and functionality of the embodiments described herein. Also, the multi-tier environment 2C00 or any aspect thereof may be implemented in any desired environment.

Users demand access to functions of enterprise applications anytime and from anywhere (e.g., from outside a native environment). This situation translates to a user demand for providing well-developed business applications, sometimes with very complex business logic to be made available to external systems 202. Such external systems 202 may be embodied as any of the aforementioned mobile devices, or an external system can be an ancillary processor which may or may not be a mobile device. It is not cost efficient (or practical) to port the entire application to an external system, and legacy attempts that merely port the user interface from the desktop to the external system are also deficient. The latter approach has failed at least in that deployers often want to enable only a subset of the functions of the enterprise application to be available on an external system (e.g., for security and/or performance reasons).

In an environment where one or more external systems 202 need to interact with a native (non-external) system, interfaces are often developed using different standards which require a specific interface to produce and consume data. There is a need to create an abstraction layer between native applications and external systems that allows for external interfaces that implement different standards and/or that implement multiple internal interfaces. This abstraction layer reduces the impact on external systems, when the native system undergoes upgrades (e.g., code changes) or any of the interfacing technologies change.

The middleware 108 comprises an instance of service proxy 210. The service proxy implements an abstraction layer to the applications, and is configured to perform any forms of change, read, update, and delete operations in accordance with a data model of a back-end application.

As shown, the solution supports form service requests (see form service request processor 212), token service requests (see token service request processor 214) and media object service requests (see media object request processor 216) using servlet based calls (e.g., 204 and 206) to the JAS server. The service proxy is extensible, and supports continued, ongoing development and functionality to be added as such needs arise.

Additional partitioning is reasonable. For example, a service proxy might receive data (e.g., data corresponding to a form field of a native application) from an external system 202 (e.g., external system $202_1$, external system $202_2$, etc.) and process that data on the native system as if the data were received natively (e.g., receiving data corresponding to a form field of the native application). Such an operation can be implemented using embodiments of the herein-disclosed form service in order to perform form-oriented operations from an external system, and such a partitioning is presented in the following FIG. 3.

Figure 3:
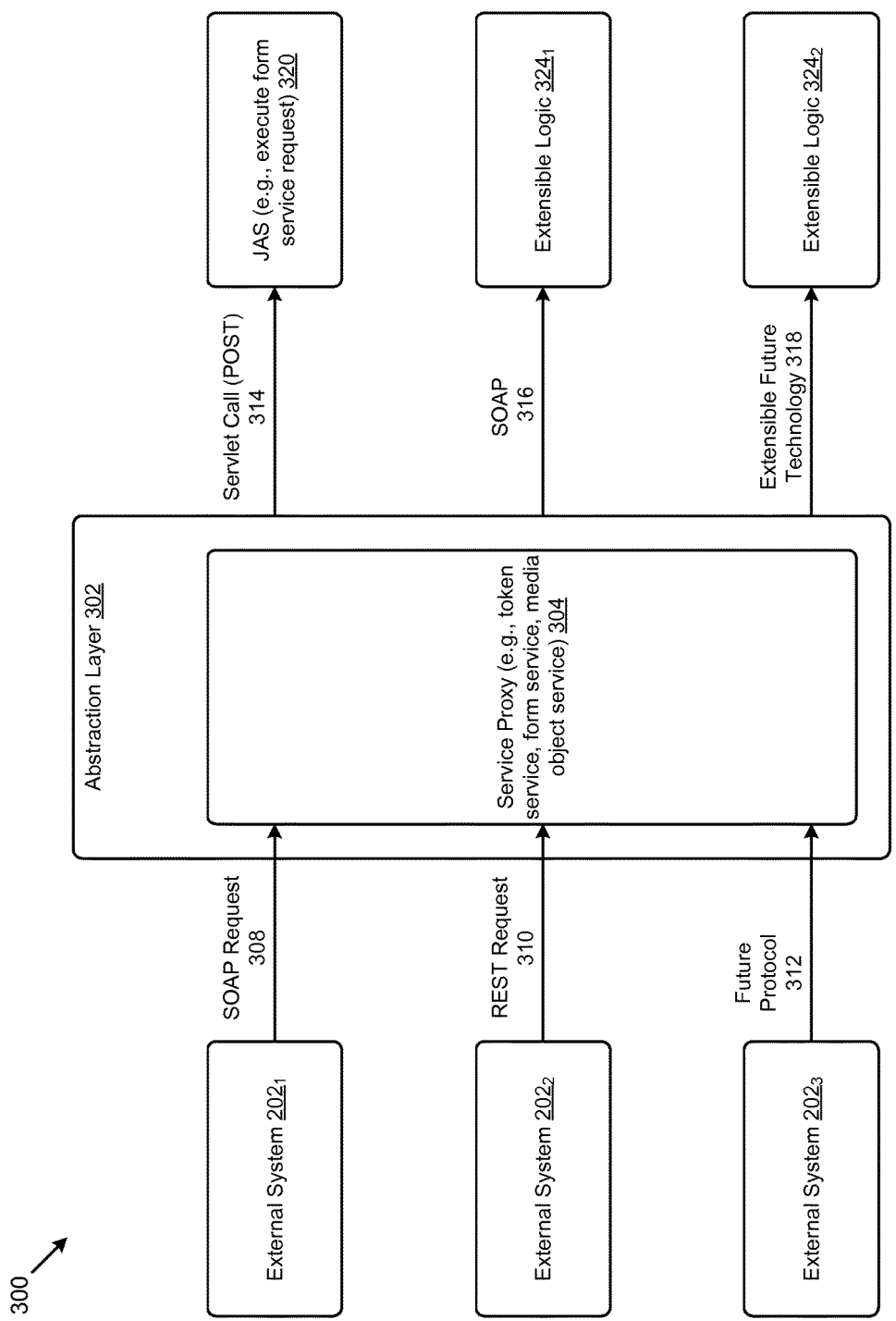
FIG. 3 depicts a partitioning of a service proxy, according to some embodiments.

FIG. 3 depicts a partitioning 300 of a service proxy. As an option, one or more instances of partitioning 300 or any aspect thereof may be implemented in the context of the architecture and functionality of the embodiments described herein. Also, the partitioning 300 or any aspect thereof may be implemented in any desired environment.

As mentioned in foregoing discussions, the service proxy can be extended or enhanced to consume a multitude of hitherto unknown business service requests. Such enhancements might include implementation of all or portions of the Simple Object Access Protocol—SOAP (e.g., see SOAP request 308) and/or such enhancements might include implementation of all or portions of the Representational State Transfer abstraction—REST (see REST request 310), or a future protocol 312 so that external systems may interface with the service proxy using any (or any combination) of those protocols.

In addition to acting as an abstraction layer between the shown applications and other current and potential external systems, the service proxy can be enabled to provide session management, caching, support of batch requests, and security improvements. Some aspects of processing of a function provided by abstraction layer 302 might involve processing by a back-end system. For example, a servlet call 314 might cause a Java server to initiate a form service request (see operation 320). Or, for example, a SOAP call 316 might initiate processing in extensible logic (see operation $324_1$ and operation $324_2$).

Figure 4A:
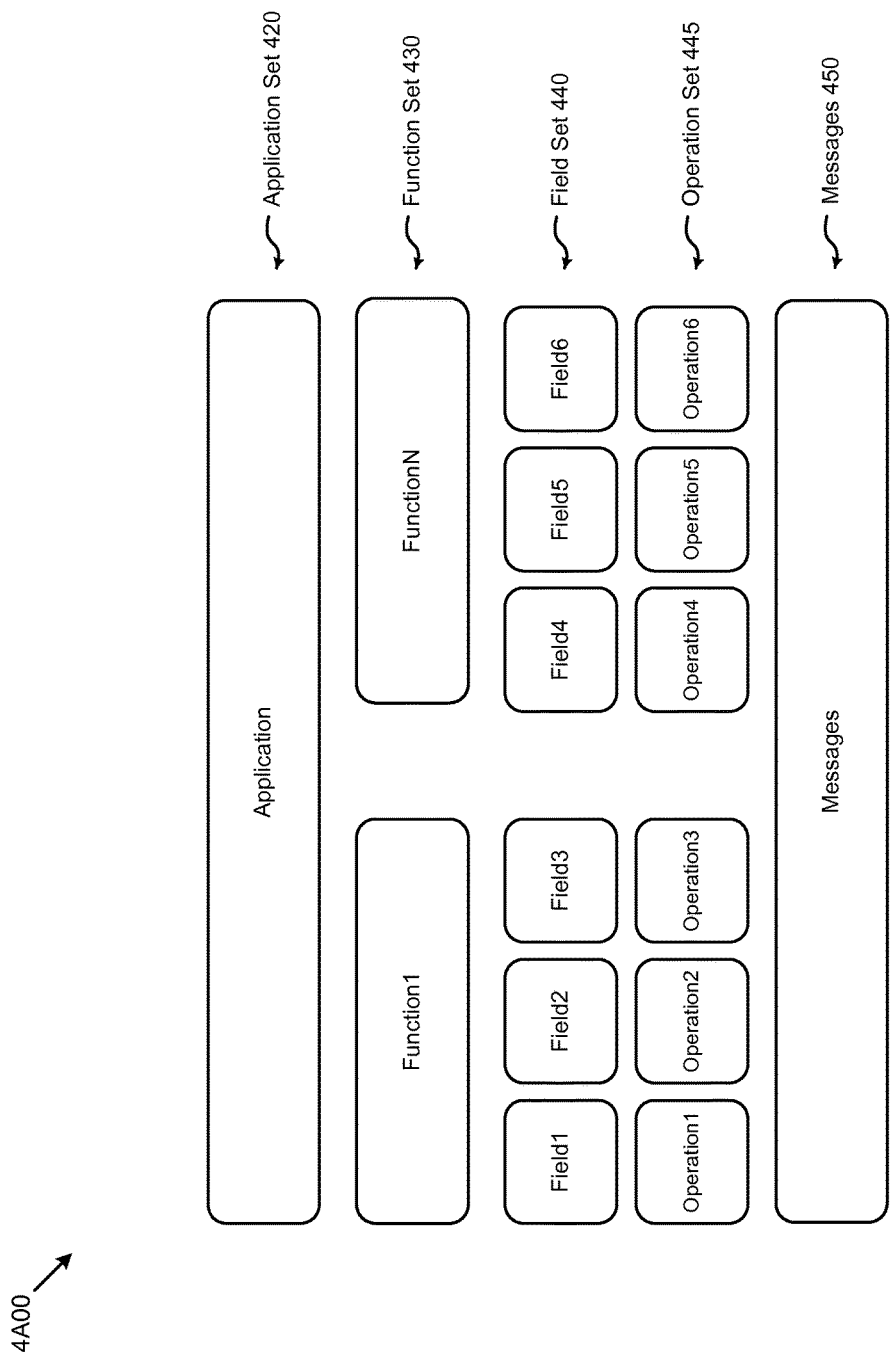
FIG. 4A depicts a sample hierarchy for specifying an object model when using a synthesis tool for automatic synthesis of native mobile applications, according to one embodiment.

FIG. 4A depicts a sample hierarchy 4A00 for specifying an object model when using a synthesis tool for automatic synthesis of native mobile applications. As an option, one or more instances of hierarchy 4A00 or any aspect thereof may be implemented in the context of the architecture and functionality of the embodiments described herein. Also, the hierarchy 4A00 or any aspect thereof may be implemented in any desired environment.

As aforementioned, a set of forms for the specified application can be known (e.g., based on a convention). Further, if a form is known, the fields can be known. And, given a set of fields, a set of corresponding operations can be known, and given a set of fields a set of messages to carry field data to and from the back-end application can also be known. In many cases, only some fields need be handled by a mobile application (e.g., only a subset of the fields and/or corresponding operations need be supported by the back-end application).

As shown, an object model hierarchy might be organized to include one or more instances of applications (e.g., see application set 420) which applications subsume multiple functions (see function set 430), which functions interact with a user through fields (see field set 440), and fields may have a one-to-one- or one-to-many relationship with an operation (see operation set 445). Any application or function or field can emit a message (see messages 450). Other hierarchies are possible, and some organizations are not strictly hierarchical.

Figure 4B:
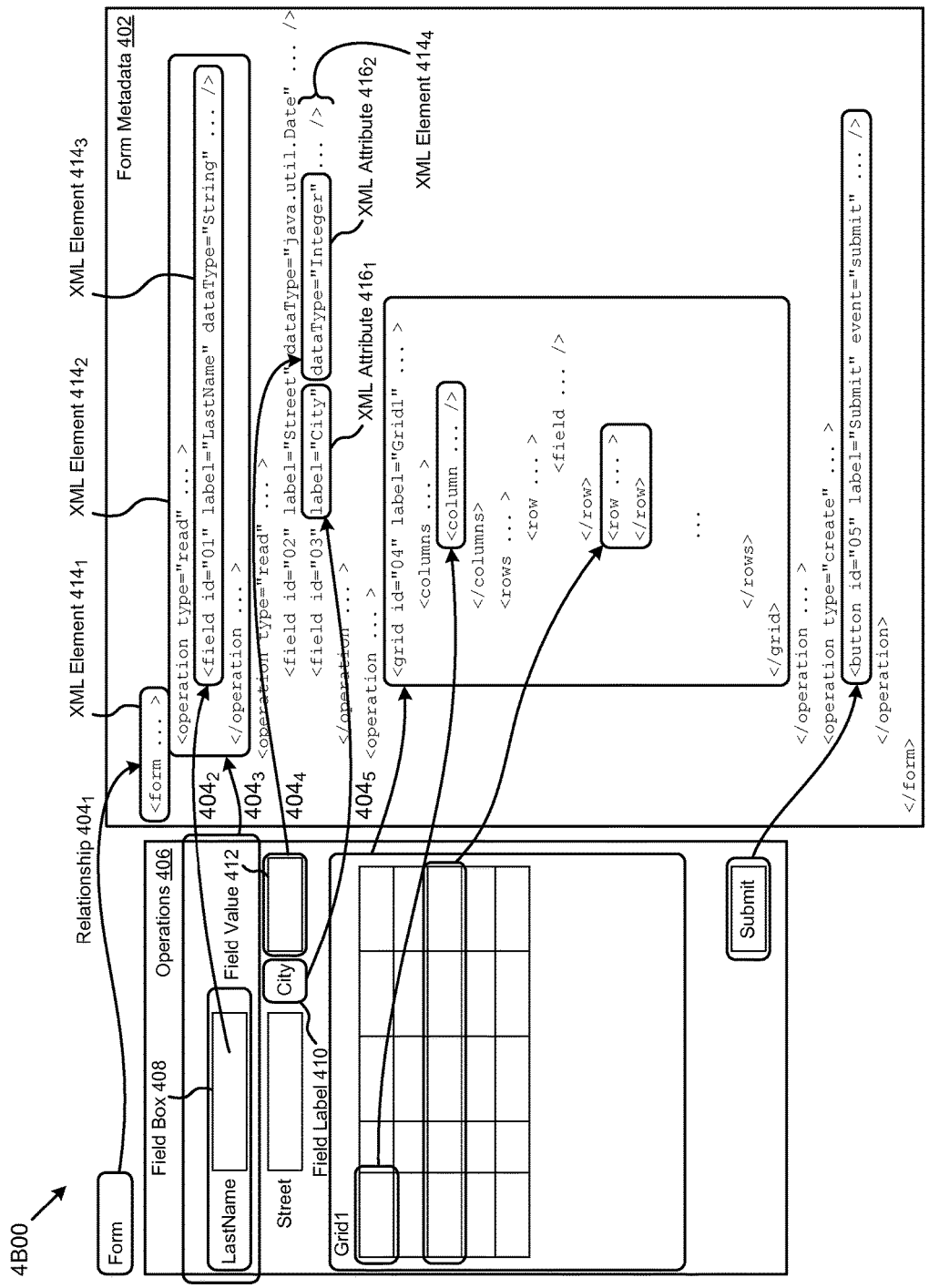
FIG. 4B depicts a form and messages taken from an object model used by a synthesis tool for automatic synthesis of native mobile applications, according to one embodiment.

FIG. 4B depicts a form and messages taken from an object model used by a synthesis tool for automatic synthesis of native mobile applications, according to one embodiment. The form and messages illustrate mapping relationships between forms, form fields, and form metadata 402. The shown mapping relationships or any aspect thereof may be implemented in any desired environment.

The mapping relationships 4B00 (e.g., as can be taken from an object model) can define any number of relationships 404 between a form and any instances of operations and/or form metadata $404_1$ thru $404_5$. Form metadata can be codified using any known technique (e.g., using XML, using BNF, etc.). Strictly as an illustrative example, the form metadata $404_1$ thru $404_5$ can be comprised of XML elements that correspond to respective form components (e.g., func-tions, operations, fields, grids, buttons, etc.). Form metadata can describe the structure and any other aspects of a form and/or its components.

As shown, a relationship $404_1$ maps the form to an XML element $414_1$. Operations 406 can have any number of associated instances of fields. Relationship $404_3$ maps the operation 406 to an XML element $414_2$. The XML element $414_2$ can comprise of any number of a variety of attributes (e.g., type, etc.). A relationship $404_2$ can map the field given in field box 408 to an XML element $414_3$. The XML element $414_3$ can comprise any number of a variety of attributes (e.g., id, label, data type, etc.). A relationship $405_4$ can map a field label 410 (e.g., city, etc.) to an XML attribute $416_1$ (e.g., label, etc.). A relationship $404_4$ can map a field value 412 to an XML attribute $416_2$ (e.g., data type, etc.) using the shown XML field element $414_4$.

The foregoing is merely one implementation, and other embodiments might directly produce maps in JSON formats rather than in XML formats. In some cases, the relationships 404 include maps to/from operations 406 using an object model, or a data structure or a hardcoded map. Runtime processes identify the form that is running (e.g., via a form identifier, or via an inference) and, based on the components used in the identified form (e.g., a date field, a drop down, grid rows, etc.), produces a JSON representation of that form.

Further details regarding a general approach to using JSON representations are described in U.S. application Ser. No. 14/179,548, entitled "RULE-BASED AUTOMATIC CLASS GENERATION FROM A JSON MESSAGE", which is hereby incorporated by reference in its entirety.

Figure 5:
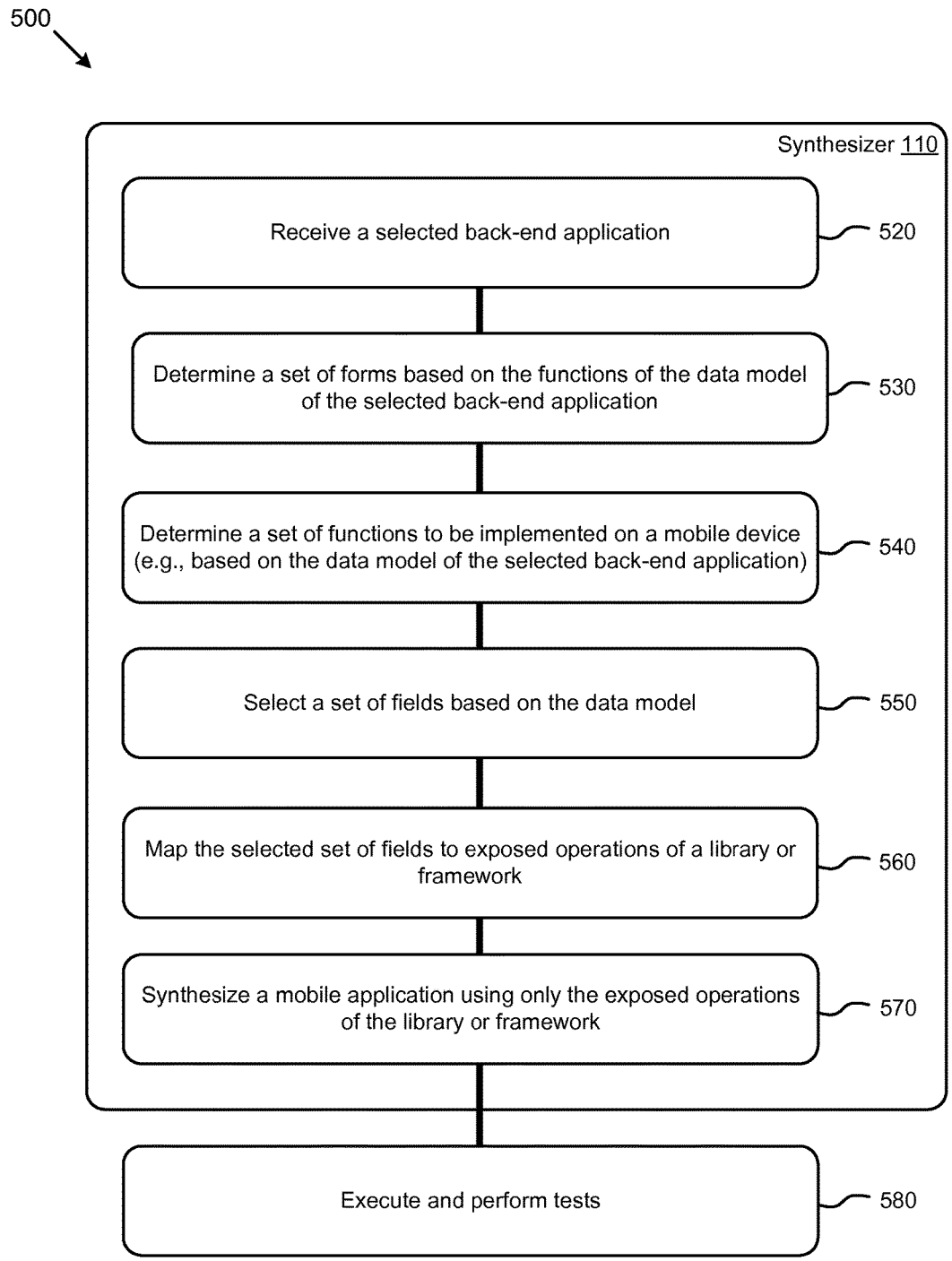
FIG. 5 presents an operation flow resulting in automatic synthesis of native mobile applications based on an application object model, according to some embodiments.

FIG. 5 presents an operation flow 500 resulting in automatic synthesis of native mobile applications based on an application object model. As an option, one or more instances of operation flow 500 or any aspect thereof may be implemented in the context of the architecture and functionality of the embodiments described herein. Also, the operation flow 500 or any aspect thereof may be implemented in any desired environment.

In the flow of FIG. 5, the synthesizer module 110 is given an identification of a back-end application (see operation 520). The application uses a set of forms that can be determined by an object model (see operation 530). As aforementioned only some fields need be handled by a mobile application. The fields can be specified explicitly by field name, or can be expressed implicitly by specification of an application from which functions are extracted, or can be specified implicitly by specification of a set of functions (see operation 540). In some cases, the selection and/or definition of the selected functions then serve to specify (e.g. implicitly) the fields to be used (see operation 550). When the needed fields and/or functions are known, then a set of corresponding messages can be known. The structure of the mobile device application is now known, and code can be mapped to and selected from a repository of native mobile application code modules (see operation 560). Such native mobile application code modules are assembled using the aforementioned techniques (see operation 570), and the mobile application code module code together with generated code (e.g., code emitted from a class generator) and/or any other code (e.g., synthesized code) can be executed on a mobile terminal (e.g., see operation 580), and tests can be performed (see operation 570).

Other flows are possible. For example, one flow commences when a synthesizer user defines a UI layout, binds controls to data controller, and defines page navigation. Another flow commences when a synthesizer user autogenerates data control based on the data control class, after which the data control automatically stays in synch with the data control class. Yet another flow commences when a synthesizer user codes interfacing rules for using the attributes and functionality the application needs to perform business logic. The interfacing rules serve for storing the attributes and calling the corresponding back-end application via the service proxy to perform the necessary business logic for the mobile application.

In some cases the synthesizer user's workflow includes modifying the underlying back-end application which is being used by the mobile application to meet customized needs.

The resulting generated mobile application supports a range of use models, for example, given a use case to "Search the Address Book by Search Type of 'C' for customer". Initial operations might be responsive to a user action (e.g., where a user enters 'C' into the UI text box. Next operations might include a system response where data is passed through data control based on the binding the developer has set between the data control and the UI's text control. A system response might also include operations where a data control module calls the data control object's setter to set its search attribute. Such a response could be based on a system-generated binding between the data control and the data control class.

In another situation, the generated mobile application supports a use model commencing upon a user action where the user clicks the search button, and the system responds by automatically executing the data control class's search method based on a binding that the developer had established. For example, a data control class can load up the parameters (search type, token, E1 form to call, etc.) into a JSON message, then serializes the JSON message and makes a request to the service proxy. The service proxy monitors the request and forwards on to the JAS server, then the JAS server runs or invokes the application.

Another flow creates a JSON data representation of the form and its data based on the parameters it was given to execute with, then returns the data back to the service proxy. The service proxy passes the data back to the mobile application, whereupon the mobile application deserializes the data into the supporting pre-generated Java objects. The supporting JSON Java objects are bound to the data control via the data control class, thus facilitating the data controller to be able to pass data to the UI controls based on a binding.

Figure 6:
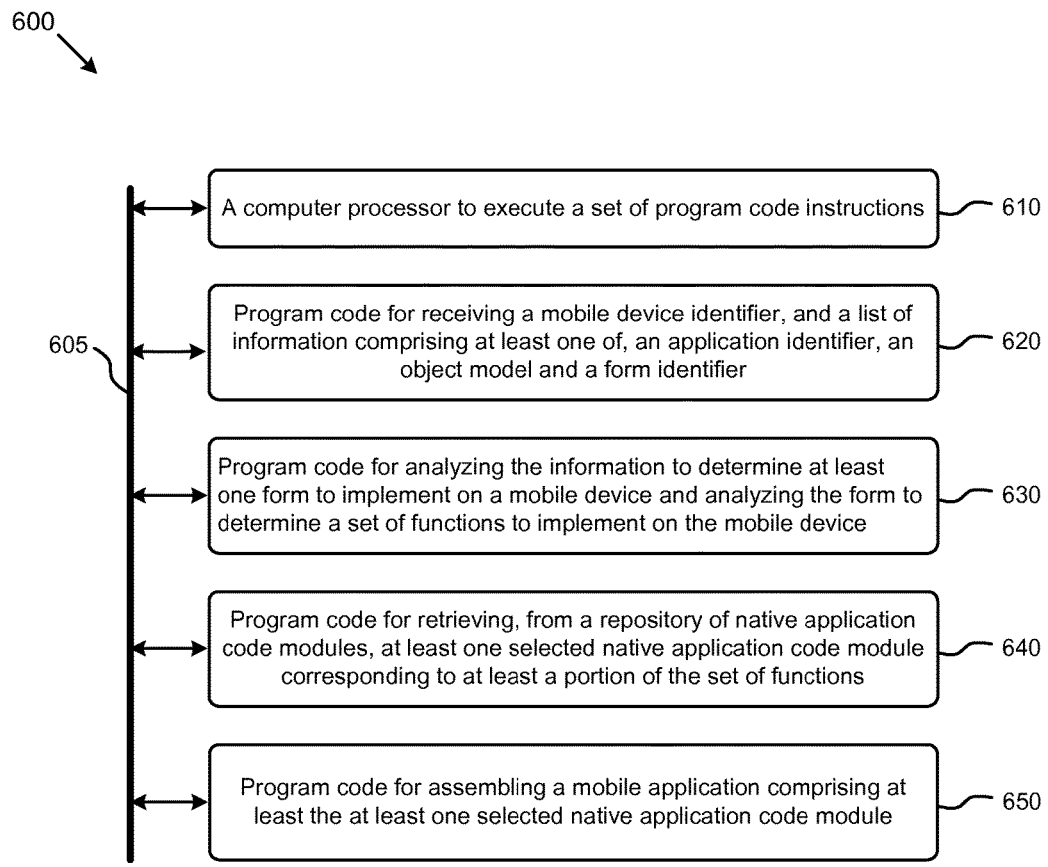
FIG. 6 is a block diagram of a system for automatic synthesis of native mobile applications based on an application object model, according to one embodiment.

Additional Embodiments of the Disclosure
Additional Practical Application Examples FIG. 6 is a block diagram of a system for automatic synthesis of native mobile applications based on an application object model, according to some embodiments. The system 600 or any operation therein may be carried out in any desired environment. System 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: receiving, from a specification module, a mobile device identifier, and a list comprising at least one of, an application identifier, an object model and a form identifier (see module 620); analyzing the information to determine at least one form to implement on a mobile device and analyzing the form to determine a set of functions to implement on the mobile device (see module 630); retrieving, from a repository of native application code modules, at least one selected native application code module corresponding to at least a portion of the set of functions (see module 640); and assembling a mobile application comprising at least the selected native application code module and based at least in part on the specification (see module 650).

System Architecture Overview
Additional System Architecture Examples

Figure 7:
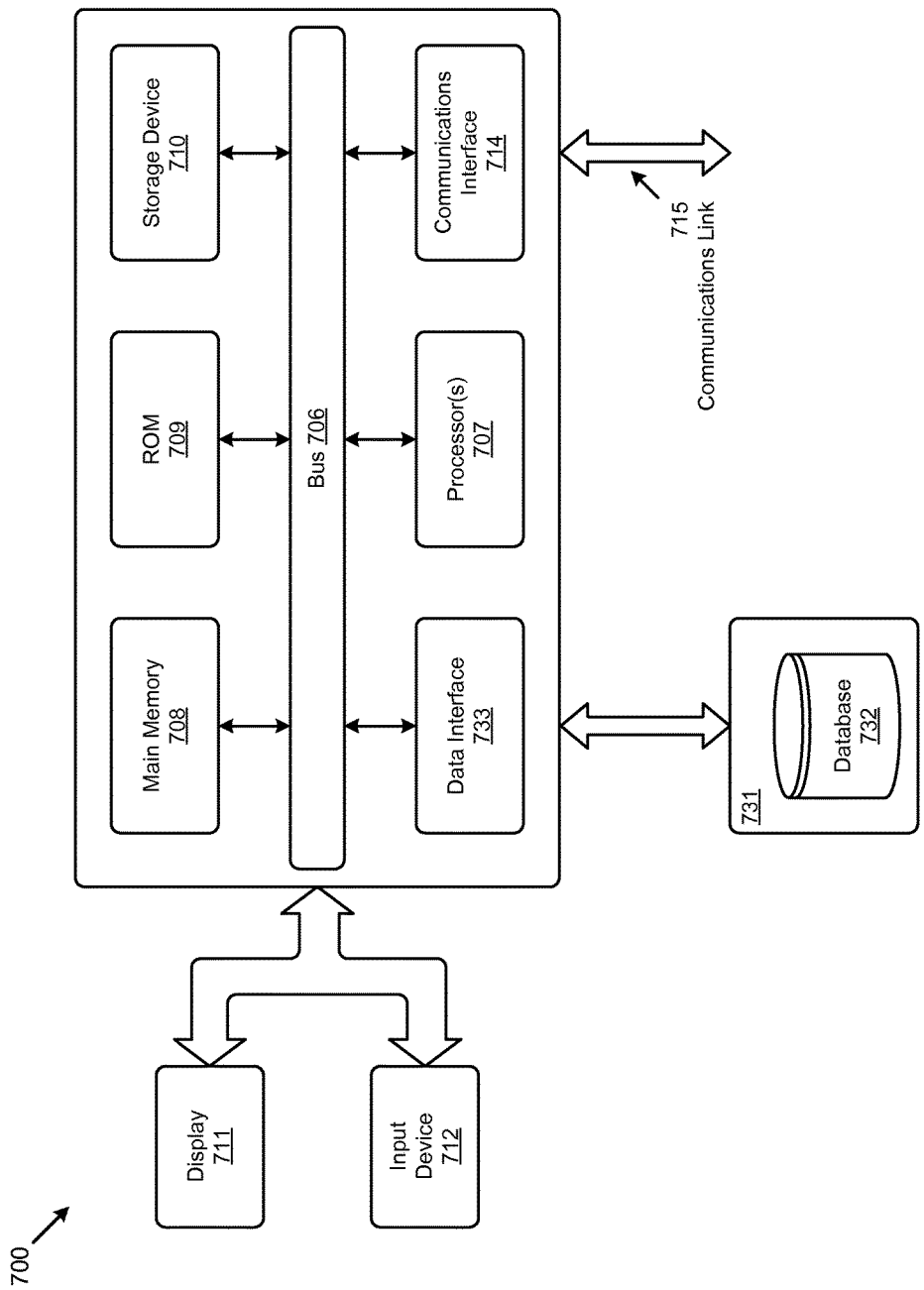
FIG. 7 depicts exemplary architectures of components suitable for implementing embodiments of the present disclosure, and/or for use in the herein-described environments.

FIG. 7 depicts a block diagram of an instance of a computer system 700 suitable for implementing embodiments of the present disclosure. Computer system 700 includes a bus 706 or other communication mechanism for communicating information, which interconnects subsystems and devices such as a processor 707, a system memory (e.g., main memory 708, or an area of random access memory RAM), a static storage device (e.g., ROM 709), a storage device 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory. Such instructions may be read into system memory from another computer readable/usable medium such as a static storage device or a disk drive. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms including, but not limited to, non-volatile media and volatile media. Non-volatile media includes, for example, optical or magnetic disks such as disk drives or tape drives. Volatile media includes dynamic memory such as a RAM memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more instances of computer system 700 coupled by a communications link 715 (e.g., LAN, PTSN, or wireless network) may perform the sequence of instructions required to practice the disclosure in coordination with one another.

Computer system 700 may transmit and receive messages, data, and instructions including programs (e.g., application code), through communications link 715 and communication interface 714. Received program code may be executed by processor 707 as it is received and/or stored in storage device 710 or any other non-volatile storage for later execution. Computer system 700 may communicate through a data interface 733 to a database 732 on an external data repository 731. Data items in database 732 can be accessed using a primary key (e.g., a relational database primary key). A module as used herein can be implemented using any mix of any portions of the system memory and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:
    identifying an existing application on a server, the existing application including at least an existing form with a set of fields; and
    generating a mobile application that both includes a new form generated from the existing application, and accesses the same existing application to perform form processing for the new form;
    the mobile application generated based on at least the existing form of the existing application on the server, the mobile application implementing at least a portion of the existing form of the existing application on the server as a new form when installed on a mobile device, the new form comprising a set of fields in the new form that correspond to the set of fields of the existing form mapped to a set of operations identified from a library, the set of operations identified from a library corresponding to one or more messages between the mobile application and the existing application on the server, and the set of fields in the new form to be processed at the existing application on the server using at least some of the one or more messages between the mobile application and the existing application, by:
        receiving a mobile device identifier and information comprising at least one of, an application identifier, an object model, or a form identifier;
        analyzing at least one of the application identifier, the object model, or the form identifier to identify an existing form of the existing application on the server to implement as the new form of the mobile application, the existing application on the server performing at least form processing on the existing form;
        analyzing the existing form of the existing application on the server to determine a set of functions to implement, the set of functions corresponding to a set of fields in the existing form;
        mapping the set of fields to a set of operations identified from a library;
        retrieving, from a repository of native application code modules, a plurality of selected native application code modules corresponding to at least a portion of the set of functions, the plurality of selected native application code modules are executable at the mobile device without reliance on a browser; and
        generating the mobile application at least by assembling at least a portion of the existing form and at least some of the plurality of selected native application code modules and by binding one or more objects to one or more fields of the set of fields in the portion of the existing form to generate the new form; and
    the mobile application accessing the same existing application to perform form processing for the new form, the mobile application implementing at least some of the set of functions corresponding to the existing form of the existing application by accessing the existing application to perform form processing on the new form using at least some of the one or more messages exchanged between the mobile application and the existing application on the server, the server including a database engine for accessing a database to support at least the set of operations.

2. The method of claim 1, wherein the object model comprises at least one of, a field, a function, and a message, and the set of fields corresponding to only
    a subset of fields of the set of fields in the existing form, the subset of fields are to be handled by the mobile application, and a remaining set of fields are not to be handled by the mobile application.

3. The method of claim 1, wherein the mobile application is deployed onto a mobile device corresponding to the mobile device identifier, the plurality of selected native application code modules serve to initiate at least one message of the one or more messages, the at least one message comprising a create operation, a replace operation, an update operation, or a delete operation.

4. The method of claim 2, further comprising:
    parameterizing the set of functions and creating relationships between the set of functions at a synthesize engine;
    generating and adding additional native code to the mobile application; and
    generating partitioning for assembling at least the portion of the existing form and the at least some of the plurality of selected native application code modules.

5. The method of claim 4, wherein the mobile device has a user interface layer configured to generate a user interface that accesses an instance of the mobile application on the mobile device, the mobile application generating a presentation layer and a data control layer on the mobile device and facilitating asynchronous communication or data exchange between the presentation layer and the data control layer using at least a set of rules and one or more commonly-accessible data structures.

6. The method of claim 5, wherein a service framework exposes a set of functions of the server to the mobile application, the service framework provides one or more first software services that do not require direct interface with the existing application on the server to the mobile device, the one or more first software services including at least one of a token service request, a media object request, or a form service request, and the service framework provides one or more second software services that interface with the existing application on the server to the mobile device, the one or more second software services including at least one of a message exchange service for exchanging one or more messages between the mobile application and the existing application on the server.

7. The method of claim 6, wherein the service framework further comprises:
a first abstraction layer between the existing application and the mobile application, the first abstraction layer allowing for multiple external interfaces implementing different standards;
a second abstraction layer to the mobile application, the second abstraction layer configured to perform change, read, update, or delete operations based in part or in whole upon a data model of the existing application on the server; and
wherein the service framework provides session management, caching, batch processing, and security.

8. The method of claim 1, wherein at least one of the plurality of selected native application code modules implement forming request messages of the one or more messages, wherein the request message comprises a representational state transfer abstraction (REST) request or the request message comprises a simple object access protocol (SOAP) request.

9. The method of claim 8, wherein the request message comprises a password.

10. The method of claim 8, wherein the request message comprises an image capture file.

11. A computer program product, embodied in a non-transitory computer readable medium, the computer readable medium having stored thereon a sequence of instructions which, when executed by a processor causes the processor to execute a set of acts, the set of acts comprising:
identifying an existing application on a server, the existing application including at least an existing form with a set of fields; and
generating a mobile application that both includes a new form generated from the existing application, and accesses the same existing application to perform form processing for the new form;
the mobile application generated based on at least the existing form of the existing application on the server, the mobile application implementing at least a portion of the existing form of the existing application on the server as a new form when installed on a mobile device, the new form comprising a set of fields in the new form that correspond to the set of fields of the existing form mapped to a set of operations identified from a library, the set of operations identified from a library corresponding to one or more messages between the mobile application and the existing application on the server, and the set of fields in the new form to be processed at the existing application on the server using at least some of the one or more messages between the mobile application and the existing application, by:
receiving a mobile device identifier and information comprising at least one of, an application identifier, an object model, or a form identifier;
analyzing at least one of the application identifier, the object model, or the form identifier to identify an existing form of the existing application on the server to implement as the new form of the mobile application, the existing application on the server performing at least form processing on the existing form;
analyzing the existing form of the existing application on the server to determine a set of functions to implement, the set of functions corresponding to a set of fields in the existing form;
mapping the set of fields to a set of operations identified from a library;
retrieving, from a repository of native application code modules, a plurality of selected native application code modules corresponding to at least a portion of the set of functions, the plurality of selected native application code modules are executable at the mobile device without reliance on a browser; and
generating the mobile application at least by assembling at least a portion of the existing form and at least some of the plurality of selected native application code modules and by binding one or more objects to one or more fields of the set of fields in the portion of the existing form to generate the new form; and
the mobile application accessing the same existing application to perform form processing for the new form, the mobile application implementing at least some of the set of functions corresponding to the existing form of the existing application by accessing the existing application to perform form processing on the new form using at least some of the one or more messages exchanged between the mobile application and the existing application on the server, the server including a database engine for accessing a database to support at least the set of operations.

12. The computer program product of claim 11, wherein the object model comprises at least one of, a field, a function, and a message, and the set of fields corresponding to only a subset of fields of the set of fields in the existing form, the subset of fields are to be handled by the mobile application, and a remaining set of fields are not to be handled by the mobile application.

13. The computer program product of claim 11, wherein the mobile application is deployed onto a mobile device corresponding to the mobile device identifier, the plurality of selected native application code modules serve to initiate at least one message of the one or more messages, the at least one message comprising a create operation, a replace operation, an update operation, or a delete operation.

14. The computer program product of claim 12, further comprising:
parameterizing the set of functions and creating relationships between the set of functions at a synthesize engine;
generating and adding additional native code to the mobile application; and
generating partitioning for assembling at least the portion of the existing form and the at least some of the plurality of selected native application code modules.

15. The computer program product of claim 14, wherein the mobile device has a user interface layer configured to generate a user interface that accesses an instance of the mobile application on the mobile device, the mobile application generating a presentation layer and a data control layer on the mobile device and facilitating asynchronous communication or data exchange between the presentation layer and the data control layer using at least a set of rules and one or more commonly-accessible data structures.

16. The computer program product of claim 11, wherein at least one of the plurality of selected native application code modules implement forming request messages of the one or more messages, wherein the request message comprises a representational state transfer abstraction (REST)

request or the request message comprises a simple object access protocol (SOAP) request.

17. The computer program product of claim 15, wherein a service framework exposes a set of functions of the server to the mobile application, the service framework provides one or more first software services that do not require direct interface with the existing application on the server to the mobile device, the one or more first software services including at least one of a token service request, a media object request, or a form service request, and the service framework provides one or more second software services that interface with the existing application on the server to the mobile device, the one or more second software services including at least one of a message exchange service for exchanging one or more messages between the mobile application and the existing application on the server.

18. The computer program product of claim 17, wherein the service framework further comprises:
 a first abstraction layer between the existing application and the mobile application, the first abstraction layer allowing for multiple external interfaces implementing different standards;
 a second abstraction layer to the mobile application, the second abstraction layer configured to perform change, read, update, or delete operations based in part or in whole upon a data model of the existing application on the server; and
 wherein the service framework provides session management, caching, batch processing, and security.

19. A system comprising:
 a computer processor to execute program code instructions; and
 a memory to hold the program code instructions, in which the program code instructions when executed by a processor performs acts comprising:
  identifying an existing application on a server, the existing application including at least an existing form with a set of fields; and
  generating a mobile application that both includes a new form generated from the existing application, and accesses the same existing application to perform form processing for the new form;
  the mobile application generated based on at least the existing form of the existing application on the server, the mobile application implementing at least a portion of the existing form of the existing application on the server as a new form when installed on a mobile device, the new form comprising a set of fields in the new form that correspond to the set of fields of the existing form mapped to a set of operations identified from a library, the set of operations identified from a library corresponding to one or more messages between the mobile application and the existing application on the server, and the set of fields in the new form to be processed at the existing application on the server using at least some of the one or more messages between the mobile application and the existing application, by:
   receiving a mobile device identifier and information comprising at least one of, an application identifier, an object model, or a form identifier;
   analyzing at least one of the application identifier, the object model, or the form identifier to identify an existing form of the existing application on the server to implement as the new form of the mobile application, the existing application on the server performing at least form processing on the existing form;
   analyzing the existing form of the existing application on the server to determine a set of functions to implement, the set of functions corresponding to a set of fields in the existing form;
   mapping the set of fields to a set of operations identified from a library;
   retrieving, from a repository of native application code modules, a plurality of selected native application code modules corresponding to at least a portion of the set of functions, the plurality of selected native application code modules are executable at the mobile device without reliance on a browser; and
   generating the mobile application at least by assembling at least a portion of the existing form and at least some of the plurality of selected native application code modules and by binding one or more objects to one or more fields of the set of fields in the portion of the existing form to generate the new form; and
  the mobile application accessing the same existing application to perform form processing for the new form, the mobile application implementing at least some of the set of functions corresponding to the existing form of the existing application by accessing the existing application to perform form processing on the new form using at least some of the one or more messages exchanged between the mobile application and the existing application on the server, the server including a database engine for accessing a database to support at least the set of operations.

20. The system of claim 19, wherein the object model comprises at least one of, a field, a function, and a message, and the set of fields corresponding to only a subset of fields of the set of fields in the existing form, the subset of fields are to be handled by the mobile application, and a remaining set of fields are not to be handled by the mobile application.

21. The method of claim 1,
 further comprising:
  parameterizing the set of functions and creating relationships between the set of functions at a synthesize engine;
  generating and adding additional native code to the mobile application;
  generating partitioning for assembling at least the portion of the existing form and the at least some of the plurality of selected native application code modules; and
 wherein:
  the object model comprises at least one of, a field, a function, and a message, and the set of fields corresponding to only a subset of fields of the set of fields in the existing form, the subset of fields are to be handled by the mobile application, and a remaining set of fields are not to be handled by the mobile application,
  the mobile application is deployed onto a mobile device corresponding to the mobile device identifier, the plurality of selected native application code modules serve to initiate at least one message of the one or more messages, the at least one message comprising a create operation, a replace operation, an update operation, or a delete operation, the mobile device has a user interface layer configured to generate a user interface that accesses an instance of the mobile application on the mobile device, the mobile application generating a presentation layer and a data control layer on the mobile device and facilitating asynchronous communication or data exchange between the presentation layer and the data control layer using at least a set of rules and one or more commonly- accessible data structures, a service framework exposes a set of functions of the server to the mobile application, provides session management, caching, batch processing, and security, the service framework provides one or more first software services that do not require direct interface with the existing application on the server to the mobile device, the one or more first software services including at least one of a token service request, a media object request, or a form service request, and the service framework provides one or more second software services that interface with the existing application on the server to the mobile device, the one or more second software services including at least one of a message exchange service for exchanging one or more messages between the mobile application and the existing application on the server, the service framework further comprises:

a first abstraction layer between the existing application and the mobile application, the first abstraction layer allowing for multiple external interfaces implementing different standards, and a second abstraction layer to the mobile application, the second abstraction layer configured to perform change, read, update, or delete operations based in part or in whole upon a data model of the existing application on the server, at least one of the plurality of selected native application code modules implement forming request messages of the one or more messages, wherein the request message comprises a representational state transfer abstraction (REST) request or the request message comprises a simple object access protocol (SOAP) request.

22. The computer program product of claim 11, further comprising:

parameterizing the set of functions and creating relationships between the set of functions at a synthesize engine;

generating and adding additional native code to the mobile application;

generating partitioning for assembling at least the portion of the existing form and the at least some of the plurality of selected native application code modules; and wherein:

the object model comprises at least one of, a field, a function, and a message, and the set of fields corresponding to only a subset of fields of the set of fields in the existing form, the subset of fields are to be handled by the mobile application, and a remaining set of fields are not to be handled by the mobile application, the mobile application is deployed onto a mobile device corresponding to the mobile device identifier, the plurality of selected native application code modules serve to initiate at least one message of the one or more messages, the at least one message comprising a create operation, a replace operation, an update operation, or a delete operation, the mobile device has a user interface layer configured to generate a user interface that accesses an instance of the mobile application on the mobile device, the mobile application generating a presentation layer and a data control layer on the mobile device and facilitating asynchronous communication or data exchange between the presentation layer and the data control layer using at least a set of rules and one or more commonly-accessible data structures, a service framework exposes a set of functions of the server to the mobile application, provides session management, caching, batch processing, and security, the service framework provides one or more first software services that do not require direct interface with the existing application on the server to the mobile device, the one or more first software services including at least one of a token service request, a media object request, or a form service request, and the service framework provides one or more second software services that interface with the existing application on the server to the mobile device, the one or more second software services including at least one of a message exchange service for exchanging one or more messages between the mobile application and the existing application on the server, the service framework further comprises:

a first abstraction layer between the existing application and the mobile application, the first abstraction layer allowing for multiple external interfaces implementing different standards, and a second abstraction layer to the mobile application, the second abstraction layer configured to perform change, read, update, or delete operations based in part or in whole upon a data model of the existing application on the server, at least one of the plurality of selected native application code modules implement forming request messages of the one or more messages, wherein the request message comprises a representational state transfer abstraction (REST) request or the request message comprises a simple object access protocol (SOAP) request.

23. The system of claim 19, the acts further comprising:

parameterizing the set of functions and creating relationships between the set of functions at a synthesize engine;

generating and adding additional native code to the mobile application;

generating partitioning for assembling at least the portion of the existing form and the at least some of the plurality of selected native application code modules; and wherein:

the object model comprises at least one of, a field, a function, and a message, and the set of fields corresponding to only a subset of fields of the set of fields in the existing form, the subset of fields are to be handled by the mobile application, and a remaining set of fields are not to be handled by the mobile application, the mobile application is deployed onto a mobile device corresponding to the mobile device identifier, the plurality of selected native application code modules serve to initiate at least one message of the one or more messages, the at least one message comprising a create operation, a replace operation, an update operation, or a delete operation, the mobile device has a user interface layer configured to generate a user interface that accesses an instance of the mobile application on the mobile device, the mobile application generating a presentation layer and a data control layer on the mobile device and facilitating asynchronous communication or data exchange between the presentation layer and the data control layer using at least a set of rules and one or more commonly-accessible data structures, a service framework exposes a set of functions of the server to the mobile application, provides session management, caching, batch processing, and security, the service framework provides one or more first software services that do not require direct interface with the existing application on the server to the mobile device, the one or more first software services including at least one of a token service request, a media object request, or a form service request, and the service framework provides one or more second software services that interface with the existing application on the server to the mobile device, the one or more second software services including at least one of a message exchange service for exchanging one or more messages between the mobile application and the existing application on the server, the service framework further comprises:

a first abstraction layer between the existing application and the mobile application, the first abstraction layer allowing for multiple external interfaces implementing different standards, and a second abstraction layer to the mobile application, the second abstraction layer configured to perform change, read, update, or delete operations based in part or in whole upon a data model of the existing application on the server, at least one of the plurality of selected native application code modules implement forming request messages of the one or more messages, wherein the request message comprises a representational state transfer abstraction (REST) request or the request message comprises a simple object access protocol (SOAP) request.

* * * * *

UNITED STATES PATENT AND TRADEMARK OFFICE
CERTIFICATE OF CORRECTION

PATENT NO. : 10,127,023 B2
APPLICATION NO. : 14/463179
DATED : November 13, 2018
INVENTOR(S) : Shakespeare et al.

Page 1 of 1

It is certified that error appears in the above-identified patent and that said Letters Patent is hereby corrected as shown below:

In the Specification

In Column 12, Line 65, delete "PTSN," and insert -- PSTN, --, therefor.

Signed and Sealed this
Twenty-ninth Day of October, 2019

Andrei Iancu
*Director of the United States Patent and Trademark Office*